United States Patent [19]

Barzuza

[11] Patent Number: 4,780,151
[45] Date of Patent: Oct. 25, 1988

[54] FLUID FILTER CLEANING METHOD

[75] Inventor: Ytzhak Barzuza, Petach Tikva, Israel

[73] Assignee: Filtration Water Filters for Agriculture and Industry Ltd., Tel Aviv, Israel

[21] Appl. No.: 733,736

[22] Filed: May 14, 1985

[30] Foreign Application Priority Data

May 24, 1984 [IL] Israel .................................... 71912

[51] Int. Cl.$^4$ .............................................. B08B 5/04
[52] U.S. Cl. ....................................... 134/21; 55/294; 55/302; 210/106; 210/108; 210/409
[58] Field of Search .................... 134/21; 55/294, 302; 210/106, 108, 409, 410, 411, 791

[56] References Cited

U.S. PATENT DOCUMENTS

| | | |
|---|---|---|
| 2,839,158 | 6/1958 | Reinaumer ............................ 55/294 |
| 3,345,805 | 10/1967 | Sherrill ................................. 55/294 |
| 3,555,785 | 1/1971 | Wooldridge et al. ................ 55/294 |
| 3,606,735 | 9/1971 | Baigas, Jr. .......................... 55/294 |
| 4,045,195 | 8/1977 | Ferri ..................................... 55/294 |
| 4,193,779 | 3/1980 | Hencke ................................ 55/294 |
| 4,359,330 | 11/1982 | Copley ................................ 55/302 |
| 4,859,095 | 3/1981 | Johnson, Jr. ........................ 55/302 |

Primary Examiner—H. M. S. Sneed
Assistant Examiner—Sharon T. Cohen
Attorney, Agent, or Firm—Sandler & Greenblum

[57] ABSTRACT

There is provided a method for cleaning corrugated filter elements by means of suction nozzles. The method comprises a corrugated filter element and at least one suction nozzle movable relative to the surface of the element. The specific parameters of the method are interrelated in accordance with a specially developed given formula.

1 Claim, 1 Drawing Sheet

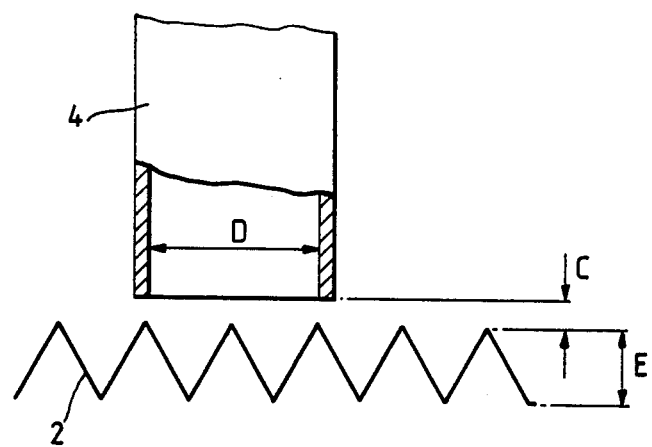

FLUID FILTER CLEANING METHOD

BACKGROUND OF THE INVENTION

The present invention relates to a system for cleaning of clogged filter elements, in particular for the cleaning, by suction nozzles, of filter elements that have a corrugated surface.

Suction nozzles for cleaning purposes have been used before, but exclusively in conjunction with smooth-surfaced, i.e., noncorrugated, filter elements, in spite of the obvious advantages offered by the corrugated elements which facilitate the accommodation, in a given filter-housing size, of a much larger filter surface. The reason for this state of affairs is the prevailing opinion that cleaning by suction is simply not suitable for corrugated filter elements, an opinion that has taken root due to the absence, so far, of proven rules that would establish clear relationships between principal filter-element and suction-nozzle parameters which, if adhered to, would ensure efficient cleaning, by suction nozzles, also of corrugated filter elements.

SUMMARY OF THE INVENTION

It is an object of the present invention to remedy the above-described situation by establishing such a relationship as can be used in the design of filters with corrugated elements that can be efficiently cleaned by means of suction nozzles.

This the invention achieves by providing a system for cleaning corrugated filter elements by means of suction nozzles, comprising a corrugated filter element and at least one suction nozzle movable relative to the surface of said element, wherein the parameters of said system are interrelated in accordance with the expression $$E \leq \frac{A(1.5 - 0.9 F \cdot G) - B \cdot C}{D}$$

where
A = cross-sectional area of nozzle (inside)
B = circumference of nozzle (inside)
C = distance from nozzle mouth to nozzle-side apices of filter corrugations
D = maximum width of nozzle perpendicular to orientation of corrugations
E = height of corrugations
F = density of corrugation $$\left(\frac{\text{length of filter portion when stretched flat}}{\text{length, across corrugation, of same portion in corrugated state}}\right)$$

G = open fraction of filter element $$\left(\frac{\text{total area of openings in element}}{\text{total filter-element surface}}\right)$$

The invention will now be described in connection with a schematic drawing.

The FIGURE illustrates a portion of a suction nozzle in proximity to a portion of a corrugated filter element.

With specific reference to the drawings, it is stressed that the particulars shown are by way of example and for purposes of illustrative discussion of the present invention only and are presented in the cause of providing what is believed to be the most useful and readily understood description of the principles of the invention. In this regard, no attempt is made to show structural details of the invention in more detail than is necessary for a fundamental understanding of the invention, the description taken with the drawing making apparent to those skilled in the art how the invention may be embodied in practice.

In the drawing there are indicated some of the design parameters of a filter comprising a corrugated filter element 2 and a suction nozzle 4 which, in a per se known manner, can be made to sweep past the corrugations.

The nozzle 4 can have any cross-sectional shape: round, square, rectangular, elliptical, and the like, and the geometry of the corrugations of the element 2 need not be triangular as shown, but can also be sinusoidal, square, trapezoidal, etc., and these shapes can be either sharp-edged, or rounded.

For effective cleaning capabilities, the design parameters of the system must be interrelated in accordance with the following expression $$E \leq \frac{A(1.5 - 0.9 F \cdot G) - B \cdot C}{D}$$

where
A = cross-sectional area of nozzle (inside)
B = circumference of nozzle (inside)
C = distance from nozzle mouth to nozzle-side apieces of filter corrugations
D = maximum width of nozzles perpendicular to orientation of corrugations
E = height of corrugations
F = density of corrugation $$\left(\frac{\text{length of filter portion when stretched flat}}{\text{length, across corrugation, of same portion in corrugated state}}\right)$$

G = open fraction of filter element $$\left(\frac{\text{total area of openings in element}}{\text{total filter-element surface}}\right)$$

Sometimes the parameters F and G are given by the manufacturers, for instance: F = 1.5:1, or G = 45%. To be used in the formula, these values must be converted into decimal fractions, in this case, F = 1.5, G = 0.45.

The above expression thus gives the largest corrugation height E of an element of a given corrugation density F and open fraction G than is still cleanable by a given nozzle.

The expression is based on an experimentally verified assumption according to which $$A \cdot F \cdot G \leq A - (E \cdot D + B \cdot C),$$

in which
A·F·G represents the water quantity which has to pass through the piece of filter element located at any instant opposite the nozzle, for this piece to be effectively cleaned;
A represents the water quantity flowing through the nozzle under given pressure conditions, and
(E·D + B·C) represent the water quantity able to take the "easy way", i.e., able to reach the suction nozzle without having been drawn through the piece of filter element opposite the nozzle, and is therefore "lost" to the cleaning process.

The 1.5 and 0.9 in the full expression are the safety factors.

For round nozzles, the expression according to the invention can be simplified to read $$E \leq \pi \left[ \frac{D(1.5 - 0.9\ FG)}{4} - C \right],$$

as with such nozzles A and B are functions of D which here stands also for the nozzle diameter.

The expression according to the invention is applicable to all filter-element configurations, both flat and cylindrical. With the latter, the corrugations may extend either in the axial direction or in radial planes, Chinese-lantern-like.

What is claimed is:

1. A method for cleaning a corrugated filter element having apices using a suction nozzle, said method comprising the step of moving said nozzle over the surface of said element at a distance C above, and clearing, the apices of said element, wherein C has the following value:

$$C \leq [A(1.5 - 0.9F \times G) - D \times E]/B$$

where:
  A is the inside cross-sectional area of the nozzle;
  B is the inside circumference of the nozzle;
  C is the spacing of nozzle mouth from the apices;
  D is the maximum width of the nozzle perpendicular to the orientation of the corrugations;
  E is the height of the corrugations;
  F is the density of the corrugations given by:

$$F = \frac{\text{length of filter portion when stretched flat}}{\text{length, across corrugations, of same portion in corrugated state}}.$$

G is open fraction of filter element given by:

$$G = \frac{\text{total area of openings in element}}{\text{total filter element surface}}.$$

* * * * *